United States Patent
Van Winsum

[11] Patent Number: 5,353,138
[45] Date of Patent: Oct. 4, 1994

[54] DISPLAY DEVICE AND SUPPORT PLATE WITH TRANSVERSE ELECTRODE ARRANGEMENT

[75] Inventor: Jacobus A. Van Winsum, Eindhoven, Netherlands

[73] Assignee: U.S. Philips Corporation, New York, N.Y.

[21] Appl. No.: 141,490

[22] Filed: Oct. 18, 1993

Related U.S. Application Data

[63] Continuation of Ser. No. 862,874, Apr. 3, 1992, abandoned.

[30] Foreign Application Priority Data

Apr. 24, 1991 [EP] European Pat. Off. ........ 91200976.8

[51] Int. Cl.⁵ ......................................... G02F 1/1343
[52] U.S. Cl. ...................................... 359/58; 359/60; 359/68
[58] Field of Search ................. 359/79, 54, 58, 60, 359/68; 340/718, 719, 784; 257/922

[56] References Cited

U.S. PATENT DOCUMENTS

| | | | |
|---|---|---|---|
| 3,532,813 | 10/1970 | Lechner | 340/784 |
| 3,654,606 | 4/1972 | Marlowe et al. | 359/60 |
| 4,666,252 | 5/1987 | Yaniv et al. | 359/60 |
| 4,679,909 | 7/1987 | Hamada et al. | 359/79 X |
| 4,773,737 | 9/1988 | Yokono et al. | 359/68 |
| 4,943,802 | 7/1990 | Kuijk | 340/784 |
| 4,994,769 | 2/1991 | Kuijk | 359/60 X |
| 5,032,830 | 7/1991 | Kuijk | 340/784 |
| 5,032,831 | 7/1991 | Kuijk | 340/784 |

*Primary Examiner*—William L. Sikes
*Assistant Examiner*—Huy Mai
*Attorney, Agent, or Firm*—Robert J. Kraus

[57] ABSTRACT

Voltage lines (6) for the reference voltage running parallel to the row electrodes (7) in a display device of the reset type provide the possibility of separately testing and repairing the picture electrodes (4) and the associated switching units (5, 11) for each pixel before connection to the reference voltage. Moreover, the device thus obtained can be driven with single-row inversion, while a larger aperture is possible and the occurrence of artefacts can be reduced.

9 Claims, 5 Drawing Sheets

DISPLAY DEVICE AND SUPPORT PLATE WITH TRANSVERSE ELECTRODE ARRANGEMENT

This is a continuation of application Ser. No. 07/862,874, filed on Apr. 3, 1992, now abandoned.

BACKGROUND OF THE INVENTION

The invention relates to a display device comprising an electro-optical display medium between two supporting plates, a system of pixels arranged in rows and columns, with each pixel being formed by picture electrodes arranged on the facing surfaces of the supporting plates, and a system of row and column electrodes for driving the pixels, a picture electrode on one of the supporting plates being connected in an electrically conducting manner to a first switching unit between a column electrode and the picture electrode and to a second switching unit between an electrode for a reference voltage and the picture electrode.

A switching unit may comprise one or more switching elements such as diodes or MIM's.

A display device of this type is suitable for displaying video information and also, for example, alpha-numerical information by means of passive display media such as liquid crystals, electrophoretic suspensions, electrochromic materials, etc.

The invention also relates to a supporting plate for use in such a display device.

A display device of the type described in the opening paragraph is known from European Patent Application No. 0 299 546 (PHN 12.154) corresponding to U.S. Pat. No. 5,032,831. In a device described in this Application the pixels are given a specific adjustment per row by accurately charging or discharging the capacitances associated with these pixels after first having discharged or charged them too far. Prior to selection an auxiliary voltage beyond or on the limit of the voltage range to be used for picture display is applied across the pixels. In one of the examples this is effected by means of switching units comprising diodes which are connected to a suitably chosen reference voltage.

A problem which occurs in the manufacture of such a display device is the possibility of tests on the active supporting plate carrying picture electrodes and the non-linear switching elements (diodes). This problem is caused because all picture electrodes and their associated switching elements are arranged parallel, as it were, in one column between the relevant column electrode and an electrode for a reference voltage. Separate measurement of the picture electrodes and their associated switching elements is thus not possible.

If a display device of the type described in the opening paragraph is to be used for colour display, it is preferably provided with a colour filter in which the colours (for example, the primary colours red, green and blue) are arranged in accordance with a "delta structure". This means that two rows of pixels are consecutively driven for one row of complete pixels (each comprising three composite pixels).

To inhibit degradation of the liquid crystal material, the pixels are regularly driven with opposite polarities, for example, every subsequent frame period. To inhibit "large-area flicker", the polarity is also reversed within one frame period after every two rows of pixels have been driven ("double-row inversion"). However, this may give rise to a slightly striped image. Another drawback is that a column electrode must be provided alternately with signals of different colours, which makes the drive electronics additionally complicated.

A further drawback of the known display device is that voltage lines for the reference voltage are provided between the pixels in the column direction. In this case one electrode usually alternates with two electrodes, between the columns of pixels, viz one electrode for the reference voltage, two column electrodes, and so forth. Such a division is not only at the expense of the effective image surface area but also gives rise to artefacts in the image.

SUMMARY OF THE INVENTION

It is an object of the present invention to provide a display device of the type described in the opening paragraph in which the switching elements and each associated picture electrode can be tested already in a sub-assembly, viz. the active supporting plate (the active panel).

It is another object of the invention to provide such a display device for colour display in which each column receives signals of one colour only so that the drive electronics are simplified while optionally single or double-row inversion is nevertheless possible.

It is a further object of the invention to provide a device of the type described in the opening paragraph, having a large effective surface area and producing substantially no artefacts.

The invention is based on the recognition that this can be achieved by structuring the column electrodes and the electrodes for the reference voltage in such a way that each picture electrode and the associated switching elements can be selected by a unique combination of these electrodes.

To this end a display device according to the invention is characterized in that the electrodes for the reference voltage and the column electrodes are arranged in the form of a matrix with pixels at the area of the crossings of the matrix and are electrically insulated from each other at the area of the crossings.

The electrodes for the reference voltage are preferably arranged transversely to the column direction.

Since each picture electrode and the associated switching elements are related to a matrix-associated crossing formed by the column electrodes and the electrodes for the reference voltage, the picture electrodes can be selected unambiguously so that each series arrangement of a picture electrode and the switching units can be tested separately.

Now, the column electrodes need no longer be arranged pairwise between columns of pixels. A column electrode can now be connected, through the switching units, alternately to a picture electrode on the left and to a picture electrode on the right. In a delta structure, in which the columns have a meandering variation, this provides the possibility of presenting information of the same colour for each column electrode, which simplifies the drive further. If necessary, inversion per row of pixels is now also possible, so that the above-mentioned problems of "double-row inversion" do not occur.

Since one column electrode is now invariably situated between two successive rows of picture electrodes, a very periodical structure, viewed in the direction of the rows, can be obtained so that the occurrence of artefacts is reduced. A larger effective surface area can also be realised, which is notably advantageous when straight column electrodes are used, as in devices for projection display and devices for datagraphic display.

After the elements have been tested, there are different possibilities of connecting the reference voltage to the associated lines. This may be effected, for example, by connecting these lines at one side to a metallization strip which may be either within or outside the sealing edge.

For redundancy considerations it is recommendable to connect these lines at two sides. This may be effected, for example, by providing the metallisation at both sides. These lines may also be connected to a connection electrode on the other supporting plate via the sealing edge which then consists of anisotropically conducting material.

A preferred embodiment of a display device according to the invention is characterized in that at least one layer of semiconductor material is present between the electrodes at the area of a crossing of the electrode for the reference voltage and the column electrode.

This layer of semiconductor material consists of, for example, amorphous silicon in which a pn junction is realised. This layer may be provided as an extra layer if the electrodes are already separated from each other by an electrically insulating material.

The row electrodes (or selection lines) of the display device need not necessarily be present on a different supporting plate, but they may also be present on the same supporting plate as the column electrodes, as described in European Patent Application No. 0 357 147 (PHN 12.651) corresponding to U.S. Pat. No. 5,032,830, in which the selection lines are capacitively coupled to the picture electrodes. A supporting plate for use in an active matrix is characterized in that the supporting plate comprises a system of picture electrodes arranged in rows and columns, in which a picture electrode is connected in an electrically conducting manner to a first switching unit between a column electrode and the picture electrode and to a second switching unit between an electrode for a reference voltage and the picture electrode, the electrodes for the reference voltage and the column electrodes crossing each other in the form of a matrix and being electrically insulated from each other at the area of a crossing.

BRIEF DESCRIPTION OF THE DRAWING

The invention will now be described in greater detail with reference to several embodiments and the drawing figures in which.

The Figures are diagrammatic and not to scale. Corresponding components are generally denoted by the same reference numerals.

DESCRIPTION OF THE PREFERRED EMBODIMENTS

Figure 1:
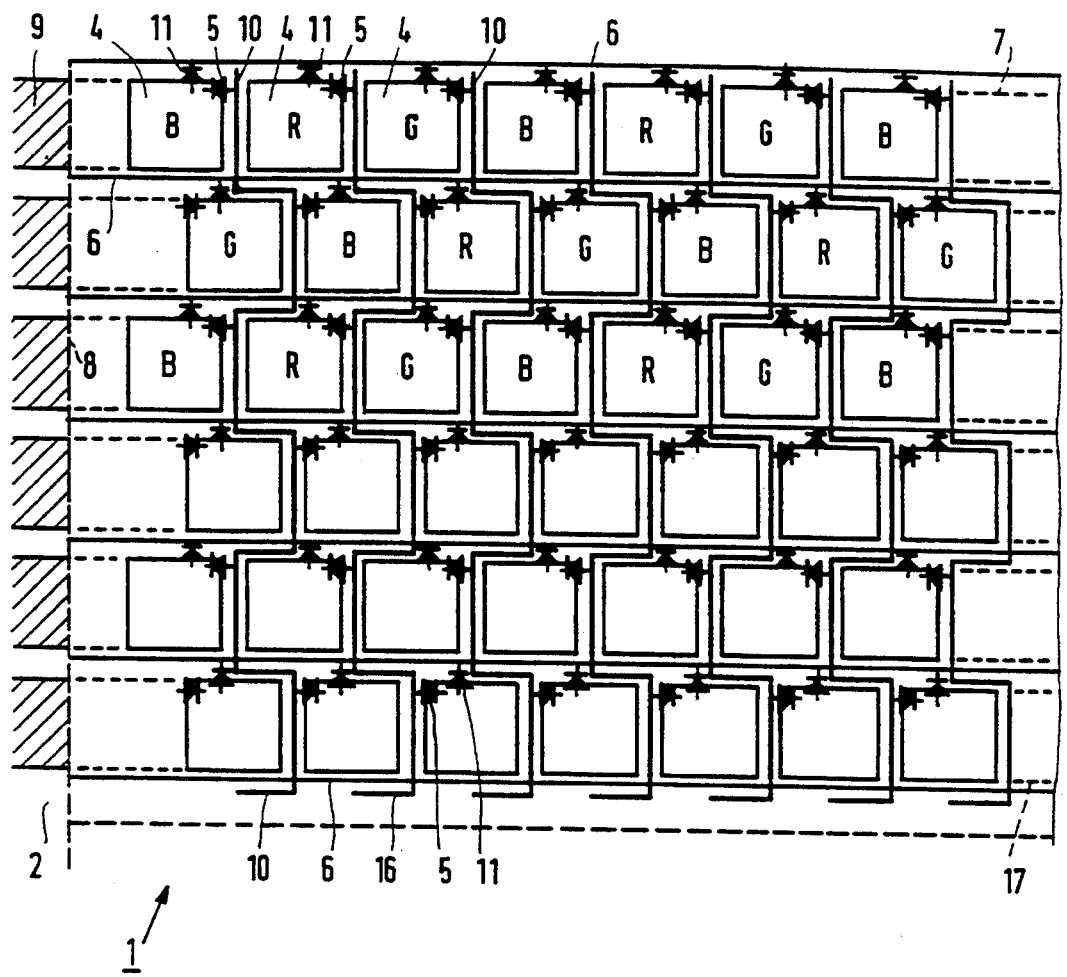
FIG. 1 is a diagrammatic plan view and a partly functional view of a part of a device according to the invention.

FIG. 1 shows a part of a supporting plate 2 partly in a plan view and partly functionally, which supporting plate forms part of a display device 1, for example, a liquid crystal display device. Picture electrodes 4 of, for example, indium-tin oxide are realised on the supporting plate 2. These picture electrodes 4 define pixels which are driven via non-linear switching units, i.e. diodes 5 in this embodiment. To this end the diodes 5 are arranged between the picture electrodes 4 and column electrodes 10 which, together with a system of row electrodes, drive the pixels. The row electrodes 7 (diagrammatically shown by means of broken lines) are present on a different supporting plate located opposite the supporting plate 2 and are structured in such a way that, together with the picture electrodes 4, they define said pixels. At the location of a sealing edge 8 diagrammatically shown by means of a broken line the row electrodes 7 are connected in an electrically conducting manner to connection tracks 9 provided on the supporting plate 2.

The present device also comprises electrodes (voltage lines) 6 for a reference voltage. The picture electrodes 4 are connected to these electrodes (voltage lines) 6 via non-linear switching units, in this case diodes 11, so that each pixel can be discharged or charged to a desired voltage. The operation and control of such a display device is further described in European Patent Application No. 0 299 546 laid open to public inspection, corresponding to the U.S. Pat. No. 5,032,831.

According to the invention the column electrodes 10 cross the lines 6 for the reference voltage and are electrically insulated therefrom. Consequently, each picture electrode 4 together with its associated diodes 5, 11 is unambiguously coupled to a crossing in the matrix constituted by the electrodes 10 and the lines 6 so that each picture electrode 4 and the associated diodes can be tested separately.

If the display device has a colour filter in which the colours are provided in accordance with a delta pattern (denoted by the letters R, G, B in FIG. 1) each column electrode 10 is connected via diodes 5 to picture electrodes 4 associated with one and the same colour. This simplifies the drive. Moreover, the occurrence of stripes is reduced in the case of single-row inversion. For each column electrode one type of colour can now be excited because the diodes 5 can now alternately drive picture electrodes on the left and on the right due to absence of the lines for the reference voltage between the columns. This also results in a regular structure in the row direction so that a larger effective surface area is obtained and the occurrence of artefacts is reduced.

Figure 2:
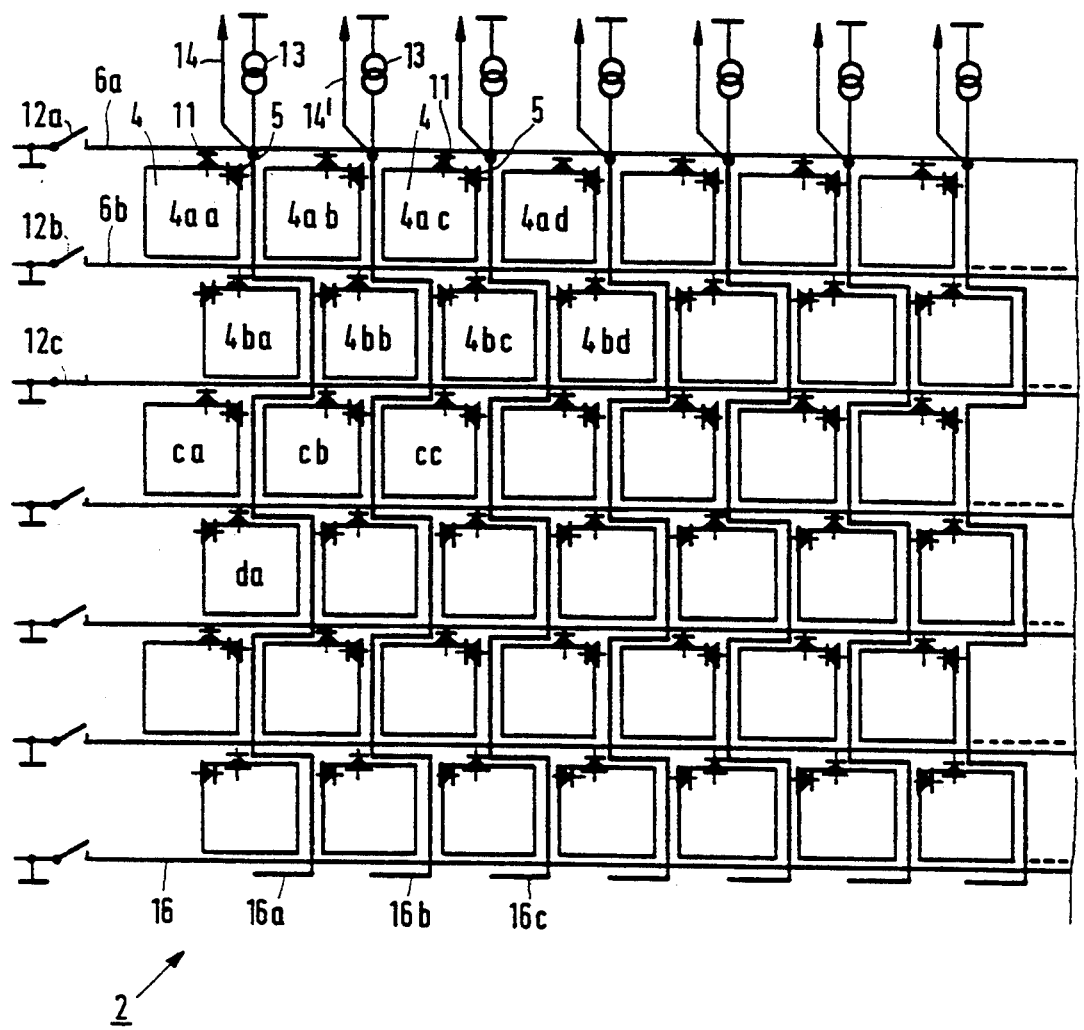
FIG. 2 shows the supporting plate of FIG. 1 during a test phase.

FIG. 2 is a diagrammatic plan view of a part of a supporting plate 2 provided with picture electrodes and the associated diodes 5, 11. Dependent on their positions, the picture electrodes are denoted as aa, ab, ac, ad . . . , ha, bb, be, bd, . . . , ca, cb, cc, etc. Each combination of picture electrode and diodes can now be tested separately by closing a switch 12 which connects an electrode 6 to a measuring and/or test arrangement in which, for example, current/voltage characteristics are measured via current sources 13 and measuring points 14. In the present embodiment switch 12c is closed so that all electrodes ca, cb, cc, . . . , are tested simultaneously or not simultaneously.

Figure 3:
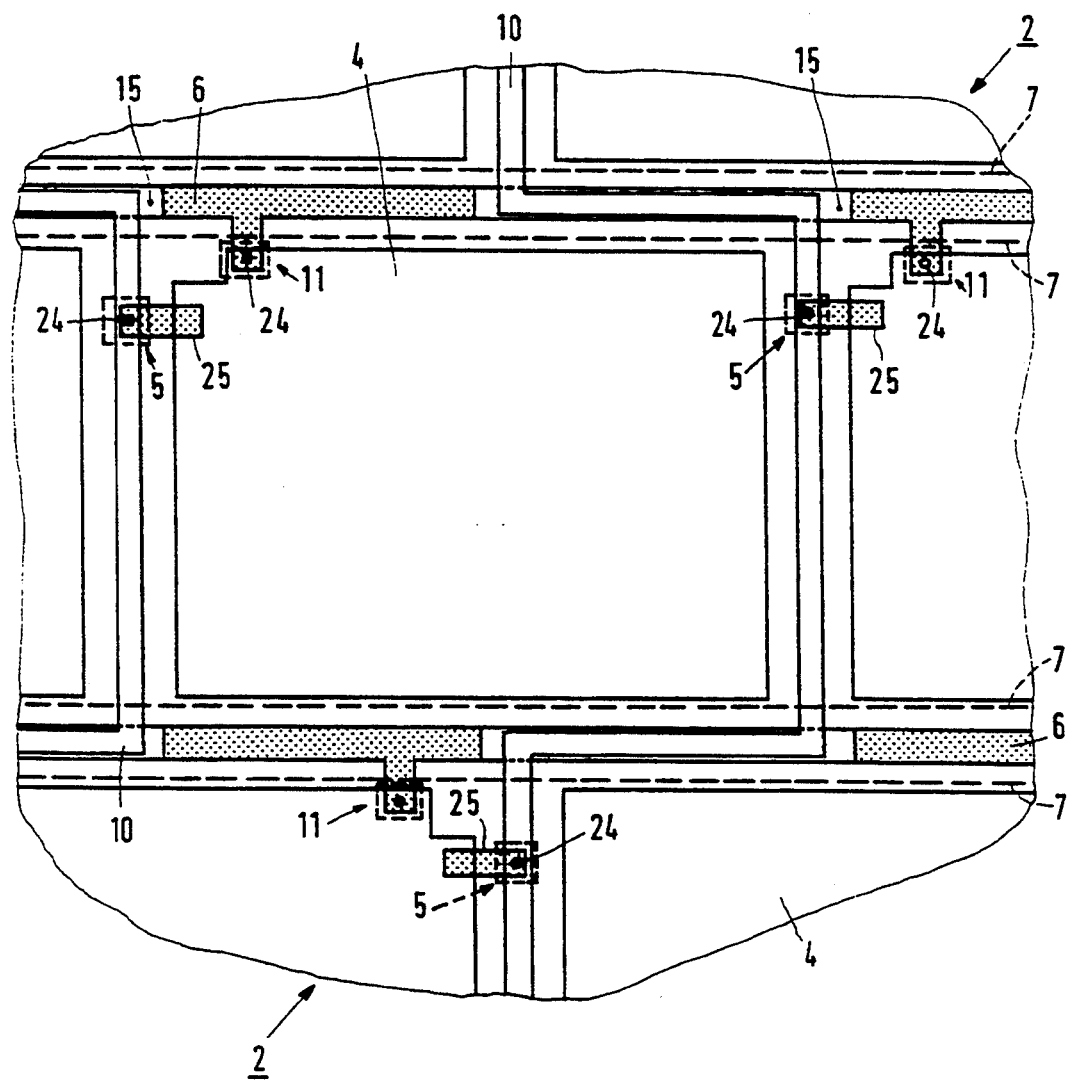
FIG. 3 is a diagrammatic plan view of a detail of the device of FIG. 1.
Figure 4:
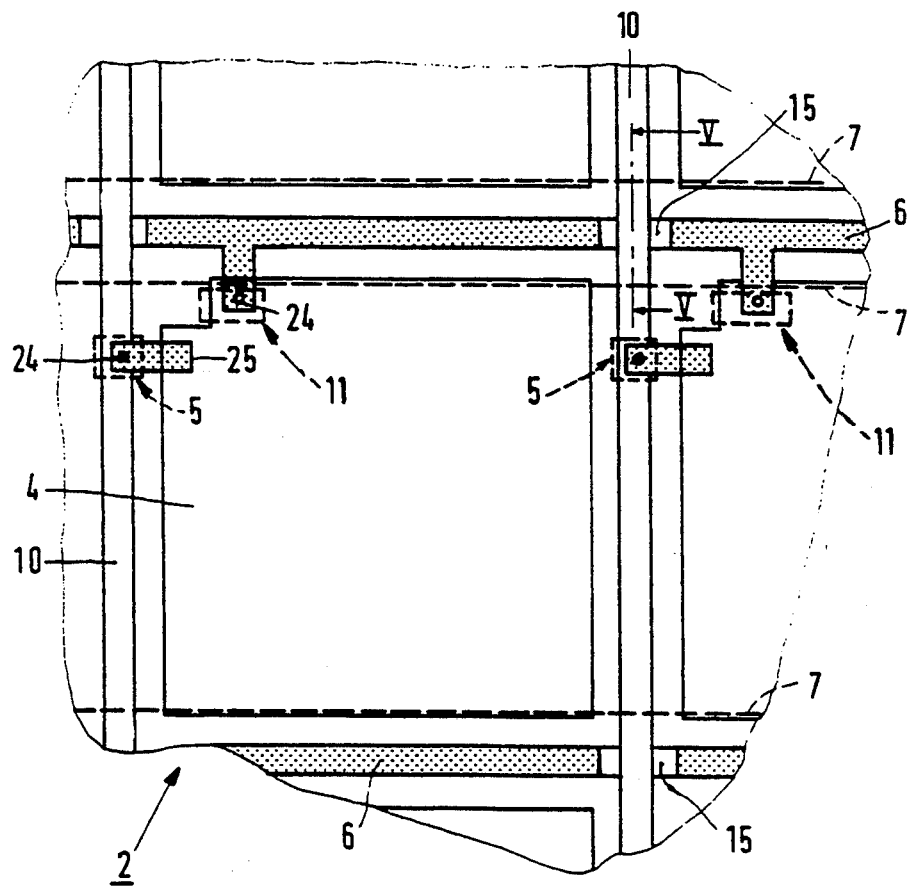
FIG. 4 shows a modification of FIG. 3, FIGS. 5 and 6 are possible cross-sections taken on the line V—V in FIG. 4.

FIGS. 3 and 4 are diagrammatic plan views of several more detailed embodiments of display devices according to the invention, particularly realisations of electrodes and diodes on the supporting plate 2. FIG. 3 shows an embodiment with a meandering pattern of the column electrodes 10, analogous to that in FIGS. 1, 2. FIG. 4 is a similar plan view with column electrodes 10 formed as straight strips perpendicular to the row direction; the latter embodiment is particularly suitable for devices for projection television and datagraphic applications.

In FIGS. 3, 4 picture electrodes 4 are again connected via diodes 5, 11 (diagrammatically shown by means of squares in broken lines which correspond, for example, to areas of amorphous silicon in which the diodes are realised) to column electrodes 10 and electrodes 6 for a reference voltage. In the embodiment of FIG. 3 the electrode 10 extends partly under the electrode 6 (in the row direction) and is insulated therefrom by an electrically insulating layer 15. However, the electrodes 4 and 10 may also be situated side by side in this embodiment. The location of the row electrodes on the other supporting plate is again shown diagrammatically by means of broken lines 7. In this embodiment the diodes 5, 11 are pin diodes having their n layers at the upper side where these diodes are connected via contact apertures 24 to a metallization strip 25 connecting the diode to the picture electrode 4 and to the voltage lines 6.

Figure 5:
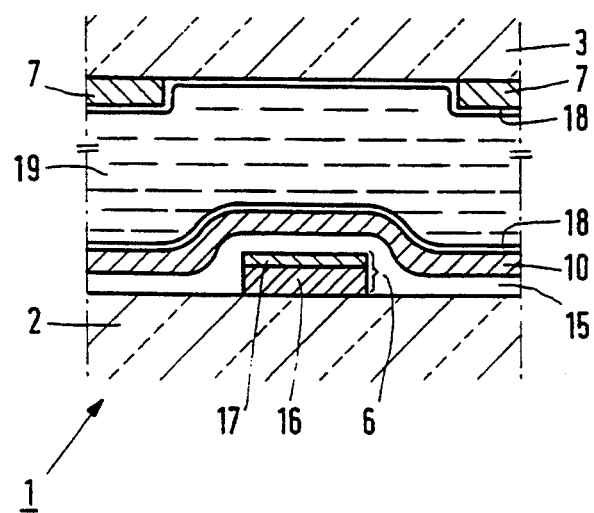
Figure 6:
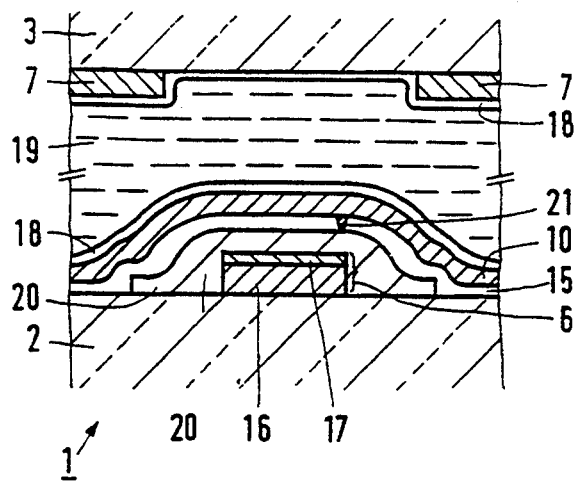

FIGS. 5 and 6 show possible cross-sections taken on the line V—V in FIG. 4. In this embodiment the electrode 6 provided on the supporting plate 2 consists of a double layer of indium-tin oxide 16 which is covered with a chromium layer 17. The electrode 10 is electrically insulated from the column electrode 6 by means of an insulation layer 15 of, for example, silicon oxide or silicon nitride. The row electrodes 7 are present on the other supporting plate 3. The two supporting plates 2, 3 are covered with an electrically insulating orientation layer 18 of, for example, polyimide which may also serve as a protective layer. A layer of liquid crystalline material 19 is sandwiched between the two plates.

In FIG. 6 a semiconductor layer 20 is present between the electrode 6 and the electrically insulating layer 15, which semiconductor layer is provided simultaneously with the areas for the diodes 5 and in which diodes are realised in a similar manner so that conductance is only possible in the direction of the electrode 10, for example, between the electrode 6 and this electrode 10. If there is a short-circuit between the semiconductor layer 20 and the column electrode 10, for example, due to a "pinhole" 21 in the layer 15, the pn junction remains reverse-biased when operating the device in accordance with a method as described in European publication No. 0 299 546 so that such a short-circuit does not have any detrimental influences.

After the matrix on the supporting plate 2 has been tested in the way as described with reference to FIG. 2 and, if necessary, has been repaired, for example, by means of laser techniques (laser-assisted deposition, laser cutting) the voltage lines 6 must be connected to a (connection for a) reference circuit. There are different possibilities to realise this. For example, the lines 6 can be mutually interconnected by means of an extra metallization step in which a metallization strip is deposited on the supporting plate 2. The additional metallization strip may be deposited either inside or outside the sealing edge 8. However, the latter possibility has the drawback that the row electrodes 7 can be connected at one side only.

Figure 7:
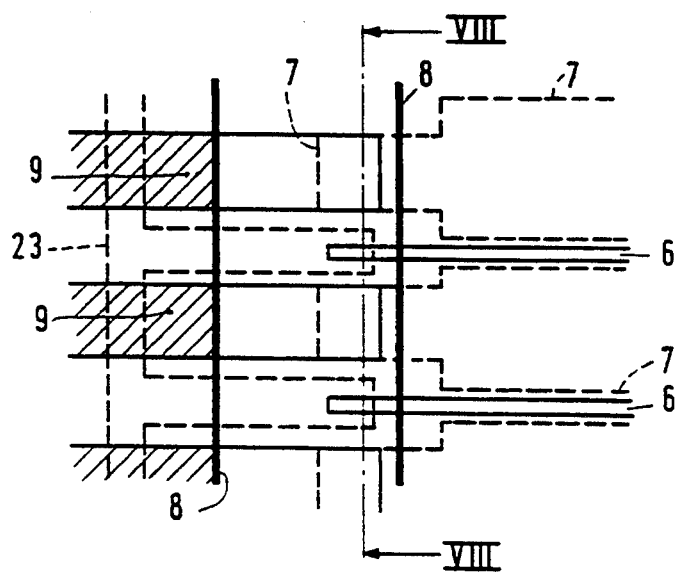
FIG. 7 is a diagrammatic plan view of another part of the device of FIG. 1.
Figure 8:
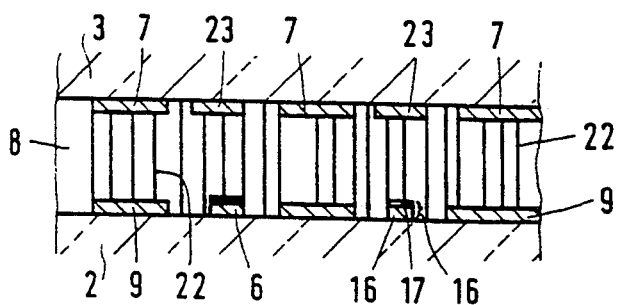
FIG. 8 is a cross-section taken on the line VII—VII in FIG. 7.

FIGS. 7 and 8 are a plan view and a cross-section, respectively, of a possible manner of connection. The sealing edge 8 consists of anisotropically conducting material, for example, a synthetic resin layer with elastic pellets dispersed therein which are, for example, gold-plated; the anisotropic way of conductance is illustrated in FIG. 8 by means of conducting tracks 22. These tracks 22 connect the metal tracks 9 which extend under the edge 8 to row electrodes 7 provided on the supporting plate 3, which row electrodes in their turn extend far enough above the edge 8 to ensure electrically conducting contact via the tracks 22. Similarly, these tracks 22 ensure the electrically conducting contact between the voltage lines 10 and an electrode 23, provided on the supporting plate 3, for the reference voltage.

The invention is of course not limited to the embodiments shown, but several variations are possible within the scope of the invention. For example, for reasons of redundancy non-linear switching units comprising several elements (parallel and/or in series) may be used instead of single diodes. The picture electrodes 4 may alternatively have different geometries. The row electrodes may also be capacitively coupled to the electrodes of the pixels and may then be realised on the same supporting plate 2 as has been described in greater detail in European Patent Application No. EP-A-0 357 147. Finally, all diodes may be switched in the other direction.

I claim:

1. A display device comprising an electro-optical medium, disposed between first and second support plates, and a system of pixels arranged in rows and columns, said display device comprising:
   a. opposing first and second systems of picture electrodes arranged on facing surfaces of the first and second support plates, respectively, for defining respective ones of the pixels;
   b. a system of row electrodes arranged on the first support plate, each of said row electrodes being electrically connected to a multiplicity of the picture electrodes of the first system which define a common row of the pixels;
   c. a system of column electrodes arranged on the second support plate, each of said column electrodes being electrically connected through respective switching elements on said second support plate to ones of the picture electrodes of the second system which define a common column of the pixels;
   d. a system of reference electrodes arranged on the second support plate, said reference electrodes being arranged transversely of and crossing the column electrodes, each of said reference electrodes:
      i. being electrically connected through respective switching elements on said second support plate to ones of the picture electrodes of the second system which define a common row of the pixels; and
      ii. being separated from the crossed column conductors by nonconductive means.

2. A display device as in claim 1 where all of the picture electrodes of the second system represent a common color.

3. A display device as in claim 1 where ones of the picture electrodes on the second support plate defining alternate rows of the pixels are staggered relative to each other and where the column electrodes on said second support plate follow meandor patterns between said staggered picture electrodes.

4. A display device as in claim 1 where, on the second support plate, each of said pixels is defined by a group of the picture electrodes, the picture electrodes in each group representing different colors.

5. A picture display device as in claim 4 where, for each column of pixels, the groups of picture electrodes in said column are arranged such that all of said picture electrodes defining a common color are aligned with each other.

6. A picture display device as in claim 4 where each of the column electrodes is electrically connected to picture electrodes representing a single one of said colors.

7. A display device as in claim 1 where the nonconductive means comprises a semiconductor material.

8. A support plate for use in an active matrix display device having a system of pixels arranged in rows and columns, said support plate supporting:
 a. a system of picture electrodes arranged for defining respective ones of the pixels;
 b. a system of column electrodes, each being electrically connected through respective switching elements on said support plate to ones of the picture electrodes which define a common column of the pixels;
 c. a system of reference electrodes arranged transversely of and crossing the column electrodes, each of said reference electrodes:
  i. being electrically connected through respective switching elements on said support plate to ones of the picture electrodes of the second system which define a common row of the pixels; and
  ii. being separated from the crossed column conductors by nonconductive means.

9. A support plate as in claim 8 where the nonconductive means comprises a semiconductor material.

* * * * *